US008080987B1

United States Patent
Qiu et al.

(10) Patent No.: US 8,080,987 B1
(45) Date of Patent: Dec. 20, 2011

(54) METHOD AND APPARATUS FOR EFFICIENT TRANSITIONING BETWEEN DIFFERENT OPERATING MODES OF A REGULATOR

(75) Inventors: Weihong Qiu, San Jose, CA (US); Kun Xing, Cary, NC (US)

(73) Assignee: Intersil Americas Inc., Milpitas, CA (US)

( * ) Notice: Subject to any disclaimer, the term of this patent is extended or adjusted under 35 U.S.C. 154(b) by 912 days.

(21) Appl. No.: 11/869,070

(22) Filed: Oct. 9, 2007

Related U.S. Application Data (60) Provisional application No. 60/871,645, filed on Dec. 22, 2006.

(51) Int. Cl.
*G05F 1/10* (2006.01)
*G05F 1/12* (2006.01)
(52) U.S. Cl. .................................. 323/288; 323/284
(58) Field of Classification Search .................. 323/288, 323/284, 224, 282, 351
See application file for complete search history.

(56) References Cited

U.S. PATENT DOCUMENTS

| | | | |
|---|---|---|---|
| 6,215,288 B1 * | 4/2001 | Ramsey et al. | 323/224 |
| 7,005,836 B1 * | 2/2006 | Rice | 323/288 |
| 7,242,598 B2 * | 7/2007 | Lipcsei | 363/132 |
| 2006/0049815 A1 * | 3/2006 | Ho et al. | 323/282 |
| 2007/0018627 A1 * | 1/2007 | Chen | 323/283 |
| 2007/0120547 A1 * | 5/2007 | Tateishi et al. | 323/282 |

FOREIGN PATENT DOCUMENTS

WO    WO 2007050256    * 5/2007

* cited by examiner

*Primary Examiner* — Gary L. Laxton
*Assistant Examiner* — Nusrat Quddus
(74) *Attorney, Agent, or Firm* — Gary R. Stanford (57) ABSTRACT

A modulator circuit for a switching regulator including first and second ramp generators, a comparator circuit and a reset circuit. The switching regulator provides a compensation voltage indicative of output voltage error. The ramp generators generate leading- and trailing-edge ramp voltages which are compared to the compensation voltage for determining pulses on a pulse modulation signal. The reset circuit prevents the leading-edge ramp voltage from resetting if the leading-edge ramp voltage has not reached the compensation voltage while ramping. The reset circuit further clamps the leading-edge ramp voltage until the pulse modulation signal is asserted again. In a multiphase configuration, each leading-edge ramp voltage is suspended if any leading-edge ramp voltage is clamped. An offset voltage may be added to the compensation, leading-edge, or trailing-edge voltages when a mode select signal indicates a reduced load condition. The offset voltage may be adjusted based on various operating conditions.

20 Claims, 7 Drawing Sheets

METHOD AND APPARATUS FOR EFFICIENT TRANSITIONING BETWEEN DIFFERENT OPERATING MODES OF A REGULATOR

CROSS-REFERENCE TO RELATED APPLICATIONS

This application claims the benefit of U.S. Provisional Application Ser. No. 60/871,645, filed on Dec. 22, 2006, which is herein incorporated by reference for all intents and purposes.

BACKGROUND OF THE INVENTION

1. Field of the Invention

The present invention relates to switching regulators and, more particularly, to regulator controllers and associated control schemes for switching regulators between PWM and PFM modes of operation for improved efficiency.

2. Description of the Related Art

Voltage regulators convert voltage from a source, such as AC (alternating current) power or a rechargeable battery, to provide the proper voltage levels for electrical circuits and components of an electronic device. Many electronic devices operate under a variety of load conditions in which the voltage regulator maintains the desired voltages with variable load current. It is desired to improve efficiency of the electronic device during variable load conditions and transitions between different operating modes.

BRIEF DESCRIPTION OF THE DRAWINGS

The benefits, features, and advantages of the present invention will become better understood with regard to the following description, and accompanying drawings in which.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

A voltage regulator may be operated in discontinuous conduction mode (DCM) and reduced frequency to improve the efficiency at light load condition when the load current is low. At heavy load, the voltage regulator may be operated in continuous conduction mode (CCM) with constant switching frequency. A conventional control scheme for switching regulators is pulse-width modulation (PWM) which varies the duty cycle as the load current varies. The PWM scheme generally achieves good regulation, low noise spectrum, low output ripple, and high efficiency during normal and/or heavy load current operation. When the load current is low, however, the PWM mode can be relatively inefficient primarily due to switching loss and high quiescent current. Voltage regulator efficiency may be improved during light load conditions (e.g., when the load current is relatively low) in DCM using pulse frequency modulation (PFM) with reduced switching frequency. During PFM, constant turn-on control can be used in which the turn-on time is the same at different load conditions and is adjusted based on the input and output voltage. With constant-on time control at DCM operation, the switching frequency automatically changes according to the load as a result of PFM control. A good method to improve efficiency is to transition operating mode from PWM to PFM when the load decreases and to transition back to PWM mode when load increases. The transition between PWM and PFM mode control should be smooth with little impact on the output voltage.

Figure 1:
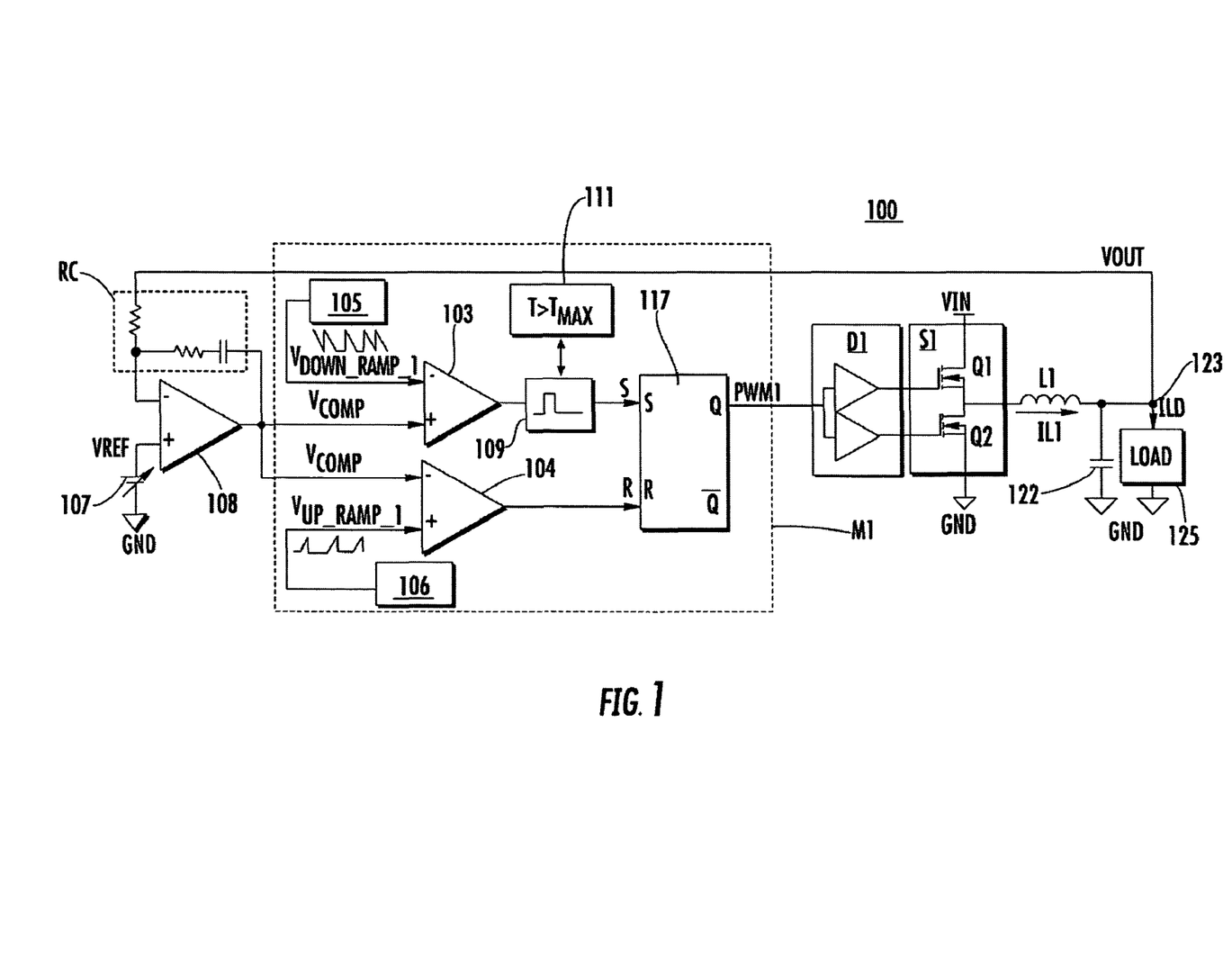
FIG. 1 is a schematic and block diagram of a switching regulator implemented according to an exemplary embodiment that switches between pulse width modulation (PWM) and pulse frequency modulation (PFM) control based on one or more operating conditions.

FIG. 1 is a schematic and block diagram of a switching regulator 100 implemented according to an exemplary embodiment that switches between pulse width modulation (PWM) and pulse frequency modulation (PFM) control based on one or more operating conditions. A modulator circuit M1 provides a signal PWM1 to an input of a driver circuit D1 having an output provided to the input of a switch circuit S1. The switch circuit S1 switches an input voltage VIN relative to ground (GND) to one side of an output inductor L1. The other end of the inductor L1 is coupled to an output node 123 which develops an output voltage VOUT filtered by a capacitor 122 coupled between node 123 and GND. The output voltage VOUT is provided to a load 125 coupled between the output node 123 and GND. A load current ILD is shown flowing from node 123 into the load 125. The output voltage VOUT is fed back to a sensing circuit for purposes of regulating output voltage. In particular, the output node 123 is coupled to a resistor-capacitor (RC) circuit which is further coupled to the inverting (−) input and the output of an error amplifier 108. The error amplifier 108 has its non-inverting (+) input receiving a reference voltage VREF. VREF is developed by a voltage source 107 coupled between the non-inverting input of the error amplifier 108 and GND. The output of the error amplifier 108 develops a compensation voltage $V_{COMP}$, which is provided to an input of the modulator circuit 110. The voltage source 107 may be variable or adjustable or the like for changing the VREF voltage level if desired.

In the illustrated embodiment, the switch circuit S1 includes two electronic switches Q1 and Q2, such as metal-oxide semiconductor, field-effect transistors (MOSFETs), coupled in series between VIN and GND with an intermediate phase node coupled to the output inductor L1. The driver circuit D1 includes a pair of gate drivers or the like to separately drive each of the switches Q1 and Q2 based on the PWM1 signal. The switches Q1 and Q2 selectively couple VIN to the inductor L1 to develop VOUT according to buck regulator operation as known to those skilled in the art. During normal PWM operation, the switch Q1 is turned on while Q2 is off to couple VIN to L1 during a first portion and then Q1 is turned off and Q2 turned on during a second portion of a PWM cycle. During normal PWM operation, the current through the inductor L1 is continuous and allowed to go negative (from node 123 back to switch circuit S1) through the switch Q2. A diode emulation mode (DEM) is implemented for light load conditions during PFM operation in which the switch Q2 is turned off when the inductor current goes to zero. In this manner, during DEM, if the inductor current attempts to go negative it is clamped at zero.

Although only a single phase is illustrated, the regulator 100 may be a single phase regulator or may represent one phase of a multiple phase regulator. In the multiphase configuration, duplicate modulator circuits (e.g., M2, etc.), driver circuits (e.g., D2, etc.), switch circuits (e.g., S2, etc.) and output inductors (e.g., L2, etc.) are included for each additional phase of the regulator. Each modulator circuit develops a corresponding PWM signal (e.g., PWM1, PWM2, etc.). The output inductors of the multiphase regulator are coupled to the common output node 123, and VOUT is sensed by a common RC circuit and the error amplifier 108 for developing a common $V_{COMP}$ signal provided to respective inputs of the multiple modulator circuits.

The modulator circuit M1 is shown first and second comparators 103 and 104, respectively, down and up ramp generators 105 and 106, respectively, a pulse generator circuit 109, a timer circuit 111, and a set-reset (SR) flip-flop 117. The $V_{COMP}$ signal is coupled to a non-inverting terminal of the comparator 103 and to an inverting terminal of the comparator 104. The down ramp generator 105 develops a down ramp voltage $V_{DOWN\_RAMP\_1}$ provided to the inverting input of the comparator 103 and the up ramp generator 106 develops an up ramp voltage $V_{UP\_RAMP1}$ provided to the non-inverting input of the comparator 104. The output of the comparator 103 is provided to the input of the pulse generator circuit 109, having an output providing a set signal S to the set input of the SR flip-flop 117. The output of the comparator 104 provides a reset signal R to the reset input of the SR flip-flop 117. The Q (non-inverting) output of the SR flip-flop 117 develops the PWM1 signal. The timing circuit 111 is coupled to the pulse generator circuit 109 for purposes of sensing generated pulses and timing intervals between pulses. In a multiphase configuration, similar up and down ramp generators are included providing corresponding up and down ramp voltages for each phase, such as signals $V_{UP\_RAMP2}$ and $V_{DOWN\_RAMP\_2}$ for a second phase, $V_{UP\_RAMP\_3}$ and $V_{DOWN\_RAMP\_3}$ for a third phase, etc.

It is understood that the relative directions of the up and down ramp voltages and the compensation signal may be reversed, such that the down ramp voltages are replaced with similar up ramp voltages and the up ramp voltages replaced with down ramp voltages while reversing the directional movement of the compensation voltage. In a more general configuration, the down ramp voltages as shown and described herein may be referred to as "leading-edge" ramp voltages which initiate a pulse on a corresponding PWM signal (e.g., the PWM1 signal) when the leading-edge ramp voltage crosses the voltage of the compensation voltage. Likewise, the up ramp voltages as shown and described herein may be referred to as "trailing-edge" ramp voltages which terminate the pulse on the corresponding PWM signal. It is further understood that the polarity of the PWM signals may be reversed such that each PWM signal is normally high and pulsed low during a power portion of each cycle. The present invention is not limited to particular directions or polarities of the signals described herein.

During normal operation of the regulator 100, the $V_{DOWN\_RAMP\_1}$ signal resets to a high voltage level above $V_{COMP}$ and then ramps down at a relatively constant rate. When the $V_{DOWN\_RAMP\_1}$ signal falls to the voltage level of the $V_{COMP}$ signal, the output of the comparator 103 switches state causing the pulse generator circuit 109 to trigger a pulse on the S signal causing the SR flip-flop 117 to assert the PWM1 signal high. The high level of the PWM1 signal activates the driver circuit D1 to initiate a power portion of the cycle. The PWM1 signal going high triggers the $V_{UP\_RAMP\_1}$ signal to begin ramping up at a relatively constant rate beginning from a relatively low voltage level. When the voltage of the $V_{UP\_RAMP\_1}$ signal reaches the voltage level of the $V_{COMP}$ signal, the comparator 104 asserts the R signal high to reset the SR flip-flop 117, which resets the PWM1 signal back low to terminate the power cycle. The PWM1 signal going low also resets the $V_{DOWN\_RAMP\_1}$ signal high. Each time a pulse is generated by the pulse generator circuit 109, the timer circuit 111 resets an elapsed time T and initiates a new time period. If the elapsed time T becomes greater than a predetermined maximum time period $T_{MAX}$, the timer circuit 111 causes the pulse generator circuit 109 to trigger another pulse on the S signal to assert the PWM1 signal high. In a multiphase configuration, each phase operates in substantially the same manner except that the respective down ramp voltages are triggering at sequential times based on the number of phases provided.

Figure 2:
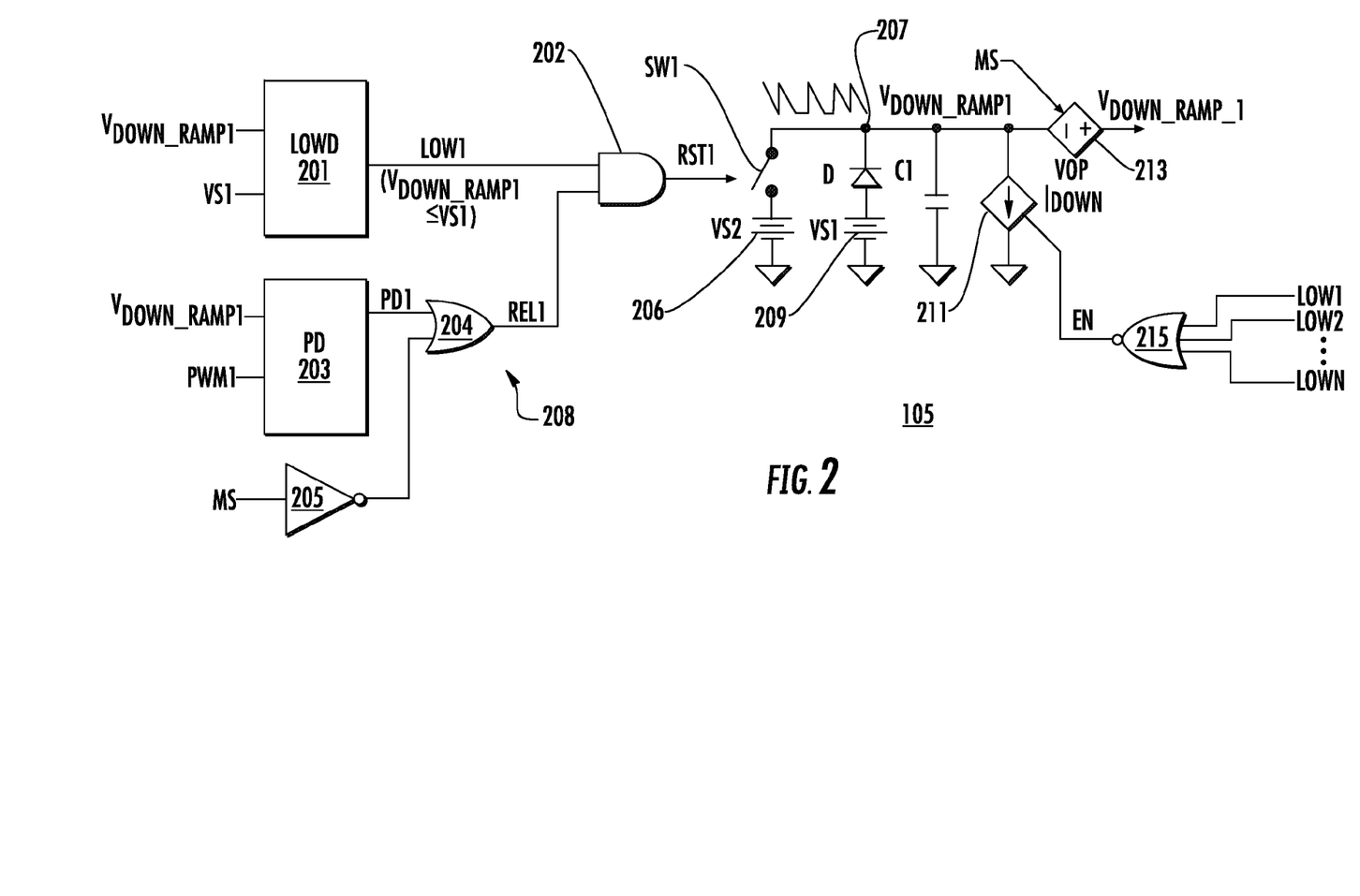
FIG. 2 is a schematic diagram of an exemplary embodiment of the down ramp generator of FIG. 1.

FIG. 2 is a schematic diagram of an exemplary embodiment of the down ramp generator 105. A down ramp low detect (LOWD) circuit 201 receives a preliminary down ramp voltage $V_{DOWN\_RAMP1}$ and the VS1 signal and provides a signal LOW1 to one input of a two-input AND gate 202. A pulse detect (PD) circuit 203 receives the $V_{DOWN\_RAMP1}$ and PWM1 signals and provides a pulse detect signal PD1 to one input of a two-input OR gate 204. A mode select (MS) signal is provided to the input of an inverter 205, having its output coupled to the other input of the OR gate 204. The output of the OR gate 204 provides a release signal REL1, which is provided to the other input of the AND gate 202. The LOWD and PD circuits 201 and 203, and the logic gates 202, 204 and 205 collectively form a reset circuit 208 used to reset the $V_{DOWN\_RAMP1}$ signal back high for particular conditions as described below. The output of the AND gate 202 provides a reset signal RST1 to the control terminal of a switch SW1 in which the switch SW1 is closed when RST1 is high and opened when RST1 is low. The switched terminals of the switch SW1 are coupled between a positive terminal of a voltage source 206 and a node 207 developing the preliminary $V_{DOWN\_RAMP1}$ signal. Another voltage source 209 has a positive terminal coupled to the anode of a diode D having a cathode coupled to node 207. The negative terminals of the voltage sources 206 and 209 are coupled to GND. A capacitor C1 is coupled between node 207 and GND. A current sink 211 is coupled between node 207 and GND and has an enable input receiving an enable (EN) signal. When the EN signal is asserted high, the current sink 211 continuously draws a current $I_{DOWN}$ from node 207. When the EN signal is negated low, the current sink 211 is temporarily disabled and the current $I_{DOWN}$ goes to zero. A voltage offset generator 213 has its negative terminal coupled to node 207 and its positive terminal providing the down ramp voltage $V_{DOWN\_RAMP\_1}$. The voltage offset generator 213 has a control terminal receiving the MS signal.

Figure 11:
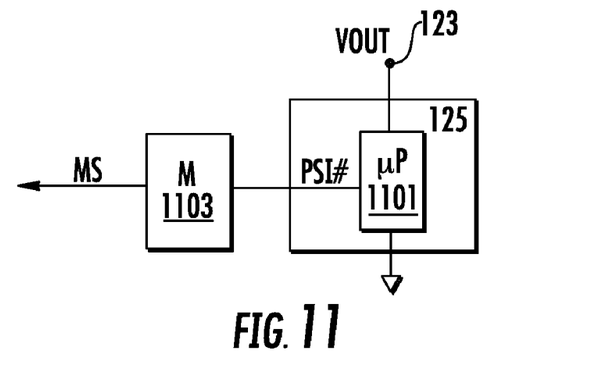
FIG. 11 is a block diagram illustrating a microprocessor in the load asserting a PSI# signal indicating desire to enter a light load condition used to switch a mode select (MS) signal.
Figure 12:
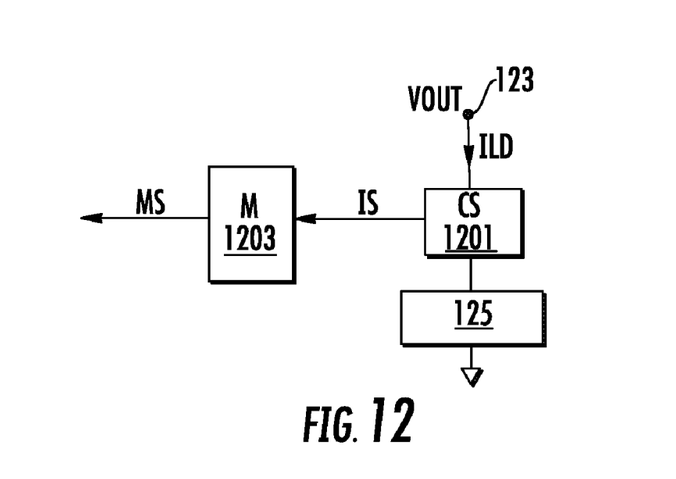
FIG. 12 is a block diagram of a current sensor sensing load current and providing a current sense signal used to switch the state of the MS signal.

In the illustrated embodiment, the MS signal is provided by a device in the load 125 or by another load current sensing device indicating the level of load current ILD. In one embodiment as illustrated in FIG. 11, the load 125 is, or otherwise includes, a microprocessor 1101 which provides or otherwise influences the MS signal to indicate the load condition of the microprocessor 1101 (or central processing unit or CPU). In a more specific embodiment, the microprocessor supports the VR11 power specification by Intel Corporation. For the VR11 specification, the CPU asserts a signal PSI# (power state indictor) or the like to indicate normal or light load conditions. The "#" symbol appended to a signal name denotes negative logic in which PSI#=logic 1 (asserted high) for normal operation and PSI#=logic 0 (asserted low) for light load condition. The MS signal is based on the PSI# signal and generally assumes the opposite state, e.g., MS=0 for normal operation and MS=1 for light load or power savings state. As shown, the PSI# signal is provided to a mode circuit 1103 which provides the MS signal. The MS signal is generated directly or otherwise based on the PSI# signal (if used) which adjusts the voltage level of the voltage offset generator 213. For example, the mode circuit 1103 may simply be equivalent to an inverting buffer or the like so that the states of the MS and PSI# signals are directly related. In another embodiment as shown in FIG. 12, a current sensor 1201 or the like is inserted in the load path and used to sense the load current ILD and provide a current sense signal indicative thereof to a mode select circuit 1203. The mode select circuit 1203 receives the IS signal and provides the MS signal. In the illustrated embodiments, the MS signal is negated low for normal operation and is asserted high during light load conditions, although any logic and logic polarity may be employed.

The $V_{DOWN\_RAMP\_1}$ signal follows the voltage level of the $V_{DOWN\_RAMP1}$ signal plus the offset voltage VOP of the voltage offset generator 213. The voltage VOP depends on the state of the MS signal. In a first state for normal operation (MS is low), the voltage across the voltage offset generator 213 is very low or zero (VOP=0) such that $V_{DOWN\_RAMP1}$=$V_{DOWN\_RAMP1}$. In the second state indicating light load conditions (MS is high), the voltage offset generator 213 generates an offset voltage VOFF (VOP=VOFF) such that $V_{DOWN\_RAMP\_1}$=$V_{DOWN\_RAMP1}$+VOFF.

During normal operation of the down ramp generator 105, the EN signal is high so that the current sink 211 continuously draws current $I_{DOWN}$ from the capacitor C1. Also during normal operation, the MS signal is low so that REL1 remains high. The voltage sources 206 and 209 generate voltages VS2 and VS1, respectively, which define the peak and valley voltage levels, respectively, of the $V_{DOWN\_RAMP1}$ signal. While the voltage level of the $V_{DOWN\_RAMP1}$ signal remains above VS1, it ramps down at a constant rate through operation of the current sink 211 discharging the capacitor C1. When the voltage level of the $V_{DOWN\_RAMP1}$ signal falls at or below VS1 (or to VS1 minus the voltage drop across the diode D), the diode D turns on and clamps the voltage of $V_{DOWN\_RAMP1}$ to just below VS1. The $V_{DOWN\_RAMP1}$ signal stays low until the RST1 signal is next asserted high. Also, when the voltage of the $V_{DOWN\_RAMP1}$ signal falls to the level of VS1, the LOWD circuit 201 asserts the LOW1 signal high causing the AND gate 202 to assert the RST1 signal high (assuming REL1 is also high). When the RST1 signal is asserted high it closes the switch SW1. The capacitor C1 is quickly charged to the voltage level of VS2 pulling the $V_{DOWN\_RAMP1}$ signal to its peak level of VS2. Since the $V_{DOWN\_RAMP1}$ signal is pulled above the voltage level of VS1, the LOWD circuit 201 negates the LOW1 signal low and the RST1 signal is also asserted back low opening the switch SW1, which causes the $V_{DOWN\_RAMP1}$ signal to begin ramping down once again. Since the MS signal is low, the $V_{DOWN\_RAMP\_1}$ signal is the same as the $V_{DOWN\_RAMP1}$ signal.

The PD circuit 203 asserts the PD1 signal low when the $V_{DOWN\_RAMP1}$ signal is reset high and asserts the PD1 signal high the next time that the PWM1 signal goes high. The PD1 signal remains low if the PWM1 signal is not asserted high even if the $V_{DOWN\_RAMP1}$ signal falls to its minimum level. Each down ramp circuit for each phase in a multiphase configuration includes a cycle detect circuit in similar manner. In normal operation when the MS signal is low, the REL1 signal is held high so that operation of the PD circuit 203 is inconsequential. When the MS signal is asserted high, then the REL1 signal is asserted high only when the PWM1 signal goes high. As previously described, the PWM1 signal goes high when the voltage level of the $V_{DOWN\_RAMP\_1}$ signal falls to the level of the $V_{COMP}$ signal. During light load conditions while the MS signal is asserted high, the $V_{COMP}$ signal may decrease to a relatively low voltage level. Furthermore, the $V_{DOWN\_RAMP\_1}$ signal is increased by VOFF, so that there is a decreased chance that the $V_{DOWN\_RAMP\_1}$ signal falling to the level of $V_{COMP}$. While the $V_{DOWN\_RAMP\_1}$ signal remains above $V_{COMP}$, the PWM1 signal remains low and the PD1 and REL1 signals remain negated low, so that the $V_{DOWN\_RAMP1}$ signal remains clamped at or below VS1. Likewise, the $V_{DOWN\_RAMP\_1}$ signal remains clamped at VS1+VOFF until the $V_{COMP}$ signal rises to the level of the $V_{DOWN\_RAMP\_1}$ signal.

In a multiphase configuration, a similar down ramp circuit is included for each modulator circuit of each phase with corresponding preliminary down ramp voltages $V_{DOWN\_RAMP1}$, $V_{DOWN\_RAMP2}$, $V_{DOWN\_RAMP3}$, etc., and corresponding down ramp voltages $V_{DOWN\_RAMP\_1}$, $V_{DOWN\_RAMP\_2}$, $V_{DOWN\_RAMP\_3}$, etc. Also in the multiphase configuration, a multiple input NOR gate 215 is included which receives the signal LOW1 and similar signals LOW2, . . . LOWN from other phases for an "N" phase configuration. In the multiphase configuration, only one NOR gate 215 is included and the EN signal is provided to a similar current sink in the down ramp circuit of each phase. In a single phase regulator configuration, the NOR gate 215 is not provided and the current sink 211 remains enabled. The LOWD circuit 201 asserts the LOW1 signal high whenever the voltage of $V_{DOWN\_RAMP1}$ signal is at or below the voltage level of VS1. A similar low detect circuit is provided for each phase so that the LOW2, . . . , LOWN signals each operate in an analogous manner. The NOR gate 215 has an output providing an enable signal EN to a control input of the current sink 211. If at any time the EN signal is negated low, then the $I_{DOWN}$ current goes to zero and the $V_{DOWN\_RAMP1}$ signal stops ramping and holds its current value. In particular, when the $I_{DOWN}$ current is zero, the capacitor C1 temporarily holds its voltage so that the $V_{DOWN\_RAMP1}$ signal temporarily stops ramping down and holds its voltage. When the EN is asserted high again, the $V_{DOWN\_RAMP1}$ signal resumes its normal down ramping function. Since the EN signal is provided to similar current sinks in each phase, whenever the EN signal is negated low, all of the down ramp voltages of all phases are temporarily suspended and hold their value. When all of the LOW1, LOW2, ..., LOWN signals are asserted low indicating that none of the preliminary down ramp voltages have reached their low values, the NOR gate 215 asserts the EN signal high. When any one of the LOW1, LOW2, ..., LOWN signals is asserted high for more than a predetermined minimum period of time, as further described below, the EN signal is negated low and the down ramp voltages for all phases are temporarily suspended as further illustrated below.

It is appreciated that during normal operation for a multiphase configuration, each of the down ramp voltages falls to VS1 sequentially over time asserting a corresponding one of the LOWx signals (in which "x" denotes an index from 1 to the number of phases, e.g., N). As soon as the corresponding LOWx signal is asserted high, and assuming the corresponding RELx signal is also asserted high, then the corresponding RSTx signal is asserted high to reset the corresponding down ramp voltage back to its high level. As soon as the corresponding down ramp voltage is reset high, the corresponding LOWx signal is negated low. In this manner during normal operation, each of the LOWx signals quickly pulses high and back low again. It is desired, however, that the EN signal remain asserted high during normal operation without glitching low during each cycle. In one embodiment, the NOR gate 215 is made relatively slow as compared to the AND gate 202 so that momentary pulsing of the LOWx signal does not affect the state of the EN signal. For example, a filter circuit or the like (not shown) at the output stage of the NOR gate 215 maintains the EN signal high during momentary pulsing of each of the LOWx signals. If any of the LOWx signals goes low and stays low for more than the predetermined minimum period of time, then the EN signal goes low and each of the down ramp voltages of each phase is temporarily suspended.

As described above, the LOWD circuit 201 operates to assert the LOW1 signal high when the $V_{DOWN\_RAMP1}$ signal has reached VS1 in an attempt to reset the $V_{DOWN\_RAMP1}$ signal high again. When MS is asserted high, however, the REL1 signal keeps the $V_{DOWN\_RAMP1}$ signal, and thus the corresponding $V_{DOWN\_RAMP\_1}$ signal, clamped low until the PWM1 signal is next asserted high (e.g., when $V_{COMP}$ rises to the level of the $V_{DOWN\_RAMP\_1}$ signal). In the multiphase configuration, if any of the down ramp voltages is clamped low, then the OR gate 215 negates the EN signal low so that all down ramp voltages are temporarily suspended until $V_{COMP}$ rises to a sufficient level.

Figure 3:
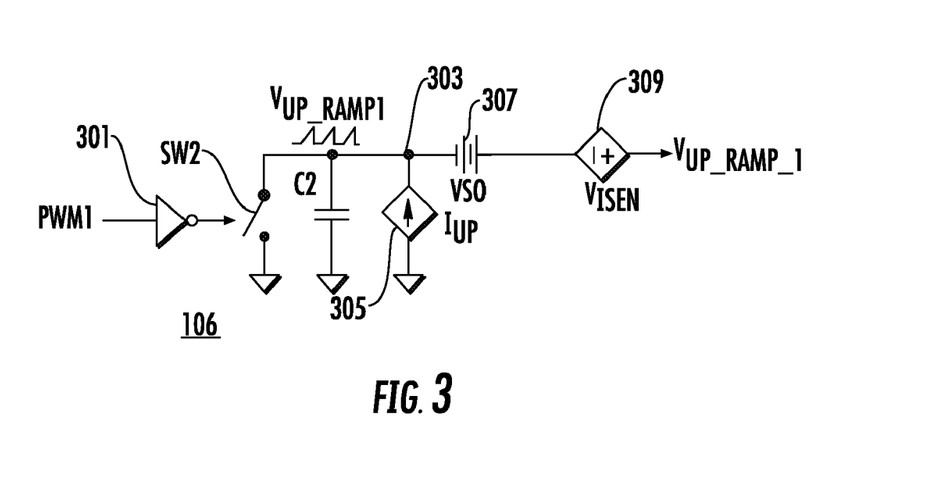
FIG. 3 is a schematic diagram of an exemplary embodiment of the up ramp generator of FIG. 1.

FIG. 3 is a schematic diagram of an exemplary embodiment of the up ramp generator 106. The PWM1 signal is provided to the input of an inverter 301, having an output coupled to the control terminal of a switch SW2. The switched terminals of the switch SW2 are coupled between GND and a node 303 developing a preliminary up ramp voltage $V_{UP\_RAMP1}$. A capacitor C2 and a current source 305 are coupled between node 303 and GND, in which the current source 305 sources a current $I_{UP}$. A voltage source 307 developing the voltage VS0 has its negative terminal coupled to node 303 and its positive terminal coupled to the negative terminal of the voltage source 309 developing a voltage $V_{ISENS}$. The positive terminal of the voltage source 309 provides the $V_{UP\_RAMP\_1}$ signal. The $V_{ISENS}$ voltage is proportional to the load current ILD and is used for peak current mode control and current balance purposes. When the $V_{ISENS}$ voltage is large, it operates analogous to conventional peak current mode control with the up ramp equivalent to an artificial ramp for stability purposes. When the $V_{ISENS}$ voltage is relatively small, it works analogous to voltage mode control. In the multiphase configuration, corresponding PWMx signals In operation of the up ramp generator 106, when the PWM1 signal is asserted low, the output of the inverter 301 is asserted high closing the switch SW2. The capacitor C2 is quickly discharged pulling the $V_{UP\_RAMP1}$ signal to GND. The $V_{UP\_RAMP1}$ signal remains clamped at GND until the PWM1 signal is asserted high, which occurs when the S signal pulses high setting the SR flip-flop 117 high. When the PWM1 signal is asserted high, the switch SW2 is opened and the current source 305 charges the capacitor C2 at a relatively constant rate of the $I_{UP}$ current. The voltage of the $V_{UP\_RAMP\_1}$ signal is related to the voltage of the $V_{UP\_RAMP1}$ signal such that $V_{UP\_RAMP\_1}=V_{UP\_RAMP1}+VS0+V_{ISENS}$. In this manner, the $V_{UP\_RAMP\_1}$ signal has a minimum voltage level of VS0, which is typically less than VS1 being the minimum voltage level of the corresponding down ramp voltage $V_{DOWN\_RAMP\_1}$. In a multiphase configuration, a similar up ramp circuit is provided for each phase to generate corresponding $V_{UP\_RAMP\_X}$ signals.

Figure 4:
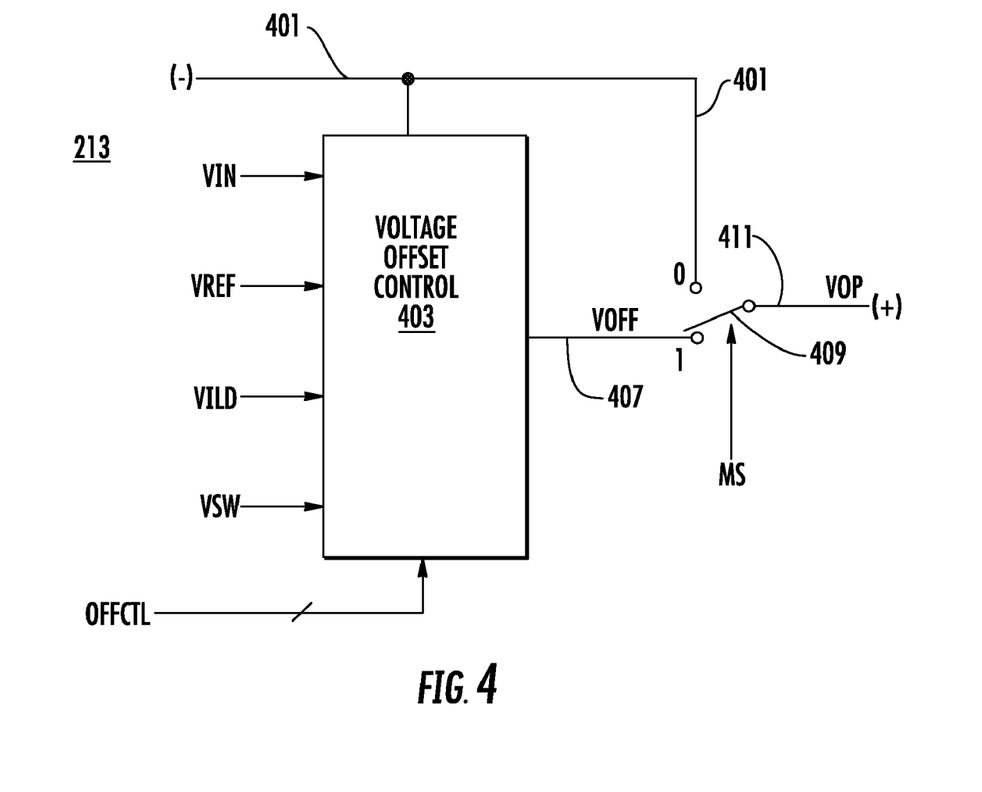
FIG. 4 is a block diagram illustrating of the voltage offset generator of FIG. 2 according to an exemplary embodiment.

FIG. 4 is a block diagram illustrating of the voltage offset generator 213 according to an exemplary embodiment. The negative terminal (−) of the voltage offset generator 213 is provided via node 401 to an input of a voltage offset control circuit 403 and to a first switched terminal of single pole, double-throw (SPDT) switch 409. The VIN and VREF signals are shown provided to respective inputs of a voltage offset control circuit 403. Also, a voltage signal VILD indicative of the level of the load current ILD is provided to another input of the voltage offset control circuit 403. Furthermore, a switching frequency voltage signal VSW indicative of the switching frequency is provided to another input of the voltage offset control circuit 403. The voltage offset control circuit 403 outputs the offset voltage VOFF on a node 407 based on the level of any one or more of the input signals VIN, VREF, VILD, VSW. The offset voltage VOFF is asserted relative to the voltage level of the negative terminal on node 401. The SPDT switch 409 is shown having a common terminal coupled to an output node 411 providing the positive terminal (+) of the voltage offset generator 213 providing the VOP offset voltage. The second switched terminal of the switch 409 is coupled to node 407 for receiving the VOFF signal. The switch 409 includes a control terminal receiving the MS signal for controlling switch operation.

One or more offset control signals OFFCTL are provided to respective inputs of the voltage offset control circuit 403. The OFFCTL signals are used to control the dependency of the VOFF signal relative to one or more of the VIN, VREF, VILD and VSW signals. For example, in one embodiment, the OFFCTL signals determine the desired combination of the VIN, VREF, VILD and VSW signals to be used to determine the voltage of VOFF, and/or the relative weighting of the selected signals, such as via corresponding weighting factors or the like. Also, the OFFCTL signals may be used to set VOFF to a predetermined default voltage level.

In operation of the voltage offset generator 213, the switch 409 switches to the second switched terminal coupled to the node 407 when the MS signal is asserted high or logic "1" (during light load operation) and switches to the first switched terminal coupled to the node 401 when the MS signal is asserted low or logic "0" (during normal operation). In this manner, the VOP is equal to zero when the MS signal is asserted low for normal operation and VOP is equal to the offset voltage VOFF when the MS signal is asserted high during light load conditions.

In an alternative embodiment, the voltage offset control circuit 403 is replaced with a simple voltage source providing a default voltage VOFF, so that MS is used to switch VOP between 0 and a default offset voltage level. In another alternative embodiment, the voltage offset control circuit 403 receives a voltage indicative of the current ILx through the inductor of the particular phase. Thus, each phase has a separate offset voltage based on the inductor current for that phase. In one embodiment, VOFF is turned on when the ILx current goes to zero so that VOFF is applicable when the inductor current goes to zero when the MS signal is high.

Figure 5:
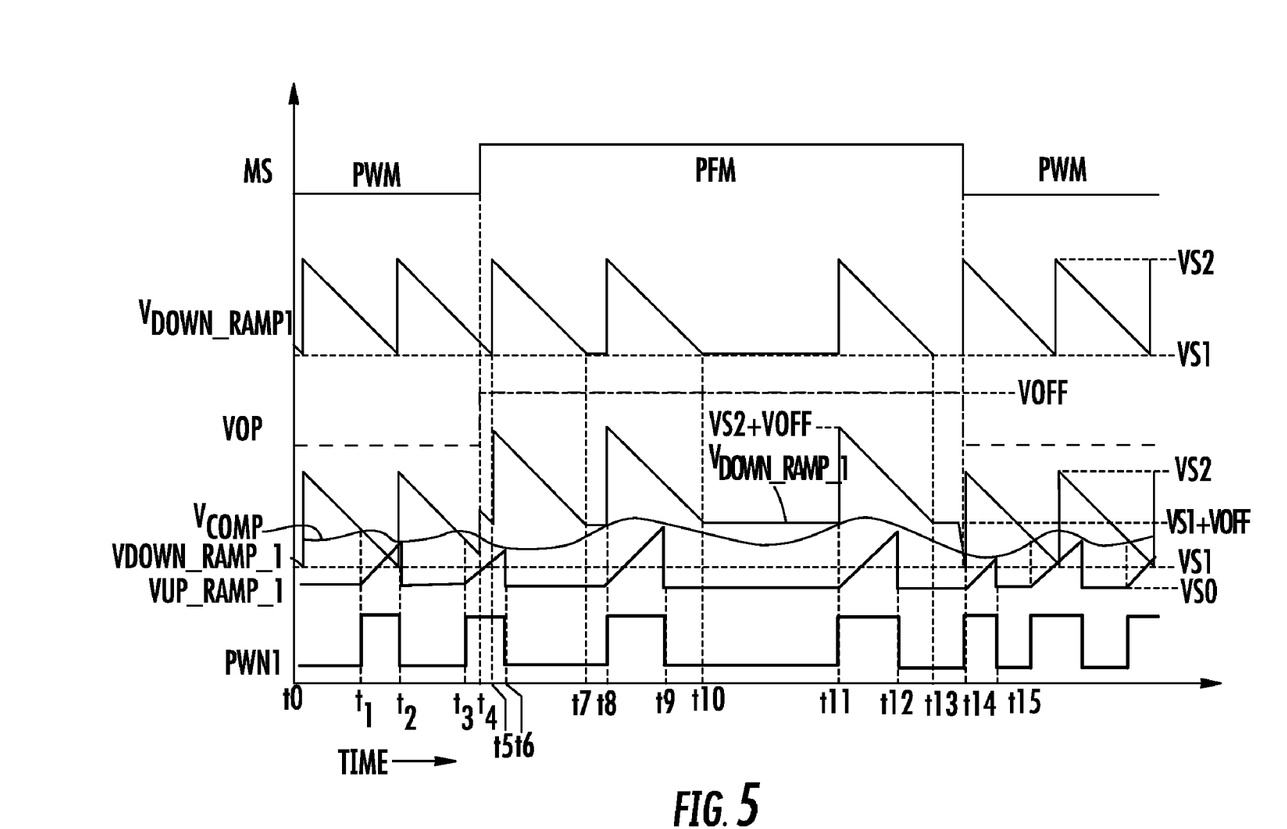
FIG. 5 is a timing diagram illustrating operational waveforms of the regulator of FIG. 1 implemented in a single-phase configuration.

FIG. 5 is a timing diagram illustrating operational waveforms of the regulator 100 implemented in a single-phase configuration. The plotted signals include MS, $V_{DOWN\_RAMP1}$, VOP, $V_{COMP}$, $V_{DOWN\_RAMP\_1}$, $V_{UP\_RAMP\_1}$, and PWM1 versus time. The $V_{COMP}$, $V_{DOWN\_RAMP\_1}$, and $V_{UP\_RAMP\_1}$ signals are superimposed together to illustrate relative voltage levels and to clarify operation. During an initial time period after an initial time t0, the MS signal is low indicating normal PWM operation. The VOP voltage level is at its minimum level or zero. The PWM1 signal is initially low clamping the $V_{UP\_RAMP\_1}$ signal to its minimum voltage level shown as VS0. It is noted that the $V_{ISENS}$ voltage is ignored or assumed to be zero to simplify operation explanation. The $V_{UP\_RAMP\_1}$ signal goes high to VS2 and ramps down towards the level of the $V_{COMP}$ signal. At a time t1, $V_{DOWN\_RAMP\_1}$ falls to the level of the $V_{COMP}$ signal causing the modulator circuit M1 to assert the PWM1 signal high. The $V_{UP\_RAMP\_1}$ begins to ramp up from VS0 towards the level of $V_{COMP}$. At about a subsequent time t2, the $V_{DOWN\_RAMP\_1}$ signal reaches its minimum value, shown as VS1, so that the LOW1 signal goes high (since MS is low and/or since the PWM1 signal was asserted high in the cycle) resetting the $V_{DOWN\_RAMP\_1}$ signal back high to VS2. Meanwhile at time t2, the voltage of the $V_{UP\_RAMP\_1}$ signal reaches the level of the $V_{COMP}$ signal causing the comparator 104 to assert the R signal to reset the PWM1 signal low. The PWM1 signal going low causes the up ramp generator 106 to reset the $V_{UP\_RAMP\_1}$ signal back low at time t2.

Operation continues in similar manner and at a subsequent time t3, the PWM1 signal goes high and the $V_{UP\_RAMP\_1}$ signal begins ramping up again. At a subsequent time t4, the MS signal goes high initiating PFM mode operation. The VOP signal is asserted to the voltage level of VOFF. It is noted that the VOFF level is shown as having a relatively constant level although it may vary depending upon the other operating signals as previously described (e.g., any combination of the VIN, VREF, VILD and VSW signals). The $V_{DOWN\_RAMP1}$ signal continues ramping down. The $V_{DOWN\_RAMP\_1}$ signal, however, immediately increases by the voltage level of VOFF at time t4 and continues ramping down from that point. At a subsequent time t5, the $V_{DOWN\_RAMP1}$ signal falls to VS1 and the $V_{DOWN\_RAMP\_1}$ signal falls to VS1+VOFF. Although MS is high, since the PWM1 had been asserted high during the down ramp cycle at time t3, the PD1 and REL1 signals are high when LOW1 is asserted high so that RST1 goes high. Thus, the $V_{DOWN\_RAMP1}$ and $V_{DOWN\_RAMP\_1}$ signals are reset high at time t5. The $V_{DOWN\_RAMP\_1}$ signal resets high to VS2+VOFF since VOP is equal to VOFF through operation of the voltage offset generator 213. The $V_{UP\_RAMP\_1}$ signal eventually reaches the voltage level of the $V_{COMP}$ signal at a subsequent time t6, and the $V_{UP\_RAMP\_1}$ and PWM1 signals are reset back low at about time t6.

The $V_{DOWN\_RAMP1}$ signal continues to ramp down after time t6 and reaches VS1 at a subsequent time t7. The $V_{DOWN\_RAMP1}$ signal falls to VS1+VOFF, which is greater than the voltage level of the $V_{COMP}$ signal at time t7. Since the PWM1 signal was not asserted high by time t7 during PFM mode of operation, the $V_{DOWN\_RAMP1}$ signal remains clamped below at VS1 and the $V_{DOWN\_RAMP\_1}$ signal is clamped at VS1+VOFF. The $V_{COMP}$ signal eventually rises to the voltage level of the $V_{DOWN\_RAMP\_1}$ signal at a subsequent time t8, so that the comparator 103 triggers the PWM1 signal high. The $V_{DOWN\_RAMP\_1}$ signal is reset high to VS2, the $V_{DOWN\_RAMP\_1}$ signal is reset high to VS2+VOFF, and the $V_{UP\_RAMP\_1}$ signal begins ramping up. It is noted that the PD1 signal is reset back low at time t8. The $V_{UP\_RAMP\_1}$ signal reaches the $V_{COMP}$ signal at a subsequent time t9, resetting both of the PWM1 and $V_{UP\_RAMP\_1}$ signals back low at time t9. At a subsequent time t10, the $V_{DOWN\_RAMP1}$ signal falls to VS1 while the $V_{DOWN\_RAMP\_1}$ signal falls to VS1+VOFF, which is greater than the voltage of the $V_{COMP}$ signal at time t10. Since PD1 is still low and PWM1 has not yet been asserted high, the $V_{DOWN\_RAMP\_1}$ initially stays low after time t10. Eventually, at a subsequent time t11 during PFM mode of operation, the $V_{COMP}$ signal rises to the level of the $V_{DOWN\_RAMP\_1}$ signal triggering the PWM1 signal high at time t11. The $V_{DOWN\_RAMP1}$ and $V_{DOWN\_RAMP\_1}$ signals reset high at time t11 and the $V_{UP\_RAMP\_1}$ signal begins rising. The $V_{UP\_RAMP\_1}$ signal rises to $V_{COMP}$ at time t12 resetting the $V_{UP\_RAMP\_1}$ signal back low. Again, at a subsequent time t13 the $V_{DOWN\_RAMP1}$ and $V_{DOWN\_RAMP\_1}$ signals reach their respective minimum levels without a pulse on the PWM1 signal, so that both temporarily remain low.

At subsequent time t14, the MS signal is negated low to reinstate normal PWM mode of operation. The VOP signal goes back to zero and the voltage level of the $V_{DOWN\_RAMP\_1}$ signal immediately drops to the same voltage level as the $V_{DOWN\_RAMP1}$ signal. The immediate decrease of the $V_{DOWN\_RAMP\_1}$ signal causes it to drop below the voltage level of the $V_{COMP}$ signal at about time t14 triggering another pulse on the PWM1 signal which ends at subsequent time t15 when the $V_{UP\_RAMP}$ signal reaches $V_{COMP}$. The normal mode of operation continues after time t15 in the same manner as previously described.

Figure 6:
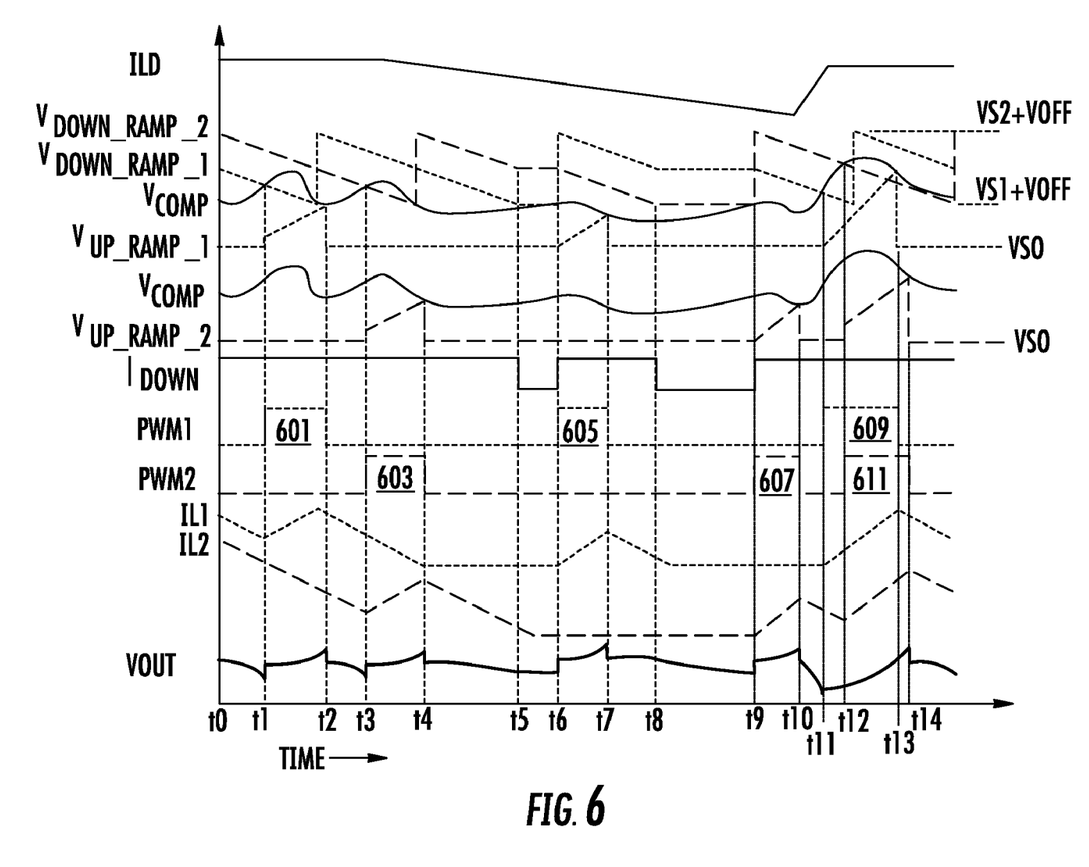
FIG. 6 is a timing diagram illustrating operational waveforms of the regulator of FIG. 1 implemented in a two phase configuration during a power savings mode when the MS signal is asserted low.

FIG. 6 is a timing diagram illustrating operational waveforms of the regulator 100 implemented in a two phase configuration during a power savings mode when the MS signal is asserted low. The two phase configuration includes two down ramp voltages $V_{DOWN\_RAMP\_1}$ and $V_{DOWN\_RAMP\_2}$, two up ramp voltages $V_{UP\_RAMP\_1}$ and $V_{UP\_RAMP\_2}$, two PWM signals PWM1 and PWM2, and two output inductors L1 and L2 with corresponding inductor currents IL1 and IL2, respectively. Each phase is controlled with a common compensation voltage $V_{COMP}$. The phases drive a common load (e.g., load 125) with a load current ILD from a common output node developing the output voltage VOUT. Although each phase includes a separate down ramp circuit with separate current sinks drawing individual $I_{DOWN}$ current signals, the separate current sinks drive the same current and are controlled by the same enable signal EN so that only one $I_{DOWN}$ signal is shown. The timing diagram plots the ILD, $V_{DOWN\_RAMP\_1}$, $V_{DOWN\_RAMP\_2}$, $V_{COMP}$, $V_{UP\_RAMP\_1}$, $V_{UP\_RAMP\_2}$, $I_{DOWN}$, PWM1, PWM2, IL1, IL2, and VOUT versus time. The $V_{DOWN\_RAMP\_1}$, $V_{DOWN\_RAMP\_2}$, $V_{COMP}$ and $V_{UP\_RAMP\_1}$ signals are superimposed together and the $V_{UP\_RAMP\_2}$ is superimposed with another copy of the $V_{COMP}$ signal. The signals associated with phase 1 ($V_{DOWN\_RAMP\_1}$, $V_{UP\_RAMP\_1}$, PWM1, and IL1) are plotted using shorter dashed lines, the signals associated with phase 2 ($V_{DOWN\_RAMP\_2}$, $V_{UP\_RAMP\_2}$, $I_{DOWN}$, PWM2, and IL2) are plotted using longer dashed lines, and the remaining signals are plotted with solid lines.

Operation is plotted from a time t0 and subsequent sequential times t1-t14 are marked for transitions of the PWM1, PWM2 and $I_{DOWN}$ signals. Although not shown, the MS signal is high and DEM is active so that the respective inductor currents IL1 and IL2 do not fall below zero. Each of the down ramp circuits includes a corresponding offset voltage generator so that the $V_{DOWN\_RAMP\_1}$ and $V_{DOWN\_RAMP\_2}$ signals transition between a low value of VS1+VOFF and VS2+VOFF. The $V_{UP\_RAMP\_1}$ and $V_{UP\_RAMP\_2}$ signals transition from VS0 which is less than VS1. The load current ILD begins high at time t0 and stays high until after a time t3, and respective pulses 601 and 603 occur on the PWM1 and PWM2 signals at times t1-t2 and t3-t4, respectively. After time t3, the load current ramps down until a subsequent time t10 when ILD increases. The $V_{COMP}$ remains relatively low between times t3 and t10, so that the $V_{DOWN\_RAMP\_1}$ signal reaches its low level (VS1+VOFF) at time t5 before the PWM1 signal is asserted high again. Thus, the $I_{DOWN}$ current is turned off so that the $V_{DOWN\_RAMP\_1}$ signal stays low. Since the $I_{DOWN}$ current is also turned off for the second down ramp circuit, the $V_{DOWN\_RAMP\_2}$ signal remains flat after time t5. The $V_{COMP}$ signal eventually rises to the level of the $V_{DOWN\_RAMP\_1}$ signal at subsequent time t6, causing a pulse 605 on the PWM1 signal. The $V_{DOWN\_RAMP\_1}$ signal resets high and the $I_{DOWN}$ current is turned back on, so that the $V_{DOWN\_RAMP\_2}$ signal resumes ramping down after time t6.

The pulse 605 on the PWM1 signal terminates at subsequent time t7 and the $V_{DOWN\_RAMP\_2}$ signal reaches its low value (VS1+VOFF) at subsequent time t8 before another pulse on the PWM2 signal and $V_{DOWN\_RAMP\_2}$ is greater than $V_{COMP}$. Thus, the $V_{DOWN\_RAMP\_2}$ signal remains clamped low until a subsequent time t9 when $V_{COMP}$ rises to the level of the $V_{DOWN\_RAMP\_2}$ signal. Since the $I_{DOWN}$ current is turned off between times t8 and t9, the $V_{DOWN\_RAMP\_1}$ signal remains flat between times t8 and t9. The $V_{DOWN\_RAMP\_2}$ signal resets back high, a pulse 607 is initiated on the PWM2 signal, and the $V_{DOWN\_RAMP\_1}$ signal resumes ramping down at time t9. The ILD current rises relatively quickly after subsequent time t10 causing the $V_{COMP}$ signal to rise relatively quickly. The $V_{COMP}$ signal reaches $V_{DOWN\_RAMP\_1}$ at time t11 causing a pulse 609 on the PWM1 signal. The $V_{COMP}$ signal continues to rise and reaches $V_{DOWN\_RAMP\_2}$ at time t12 causing a pulse 611 on the PWM2 signal. The pulses 609 and 611 are both asserted simultaneously between times t12 and t13 to maintain the VOUT signal relatively stable even during the PFM mode of operation.

Figure 7:
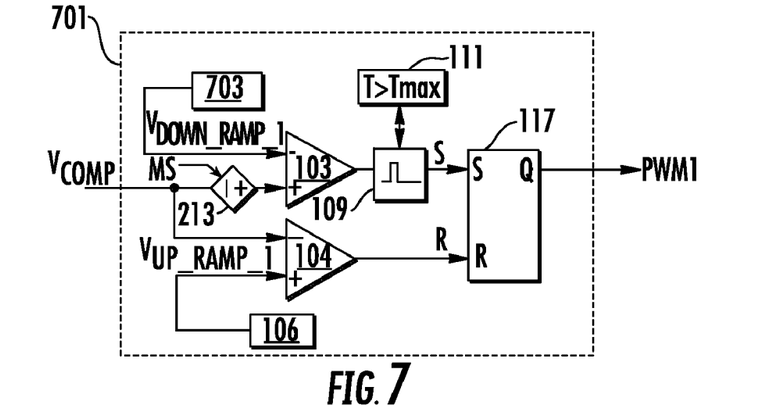
FIG. 7 is a schematic and block diagram of a modulator circuit according to an alternative embodiment which replaces the modulator circuit of FIG. 1.

FIG. 7 is a schematic and block diagram of a modulator circuit 701 according to an alternative embodiment which replaces the modulator circuit M1. The modulator circuit 701 is substantially similar to the modulator circuit M1 except that the down ramp generator 105 is replaced by a down ramp generator 703. The down ramp generator 703 is substantially identical to the down ramp generator 105 except that the voltage offset generator 213 is removed so that $V_{DOWN\_RAMP\_1} = V_{DOWN\_RAMP1}$. Instead, the voltage offset generator 213 is moved between the $V_{COMP}$ signal and the non-inverting input of the comparator 103. The voltage offset generator 213 is configured in a similar manner and is controlled by the MS signal as previously described. Operation of the modulator circuit 701 is substantially identical to operation of the modulator circuit M1.

Figure 8:
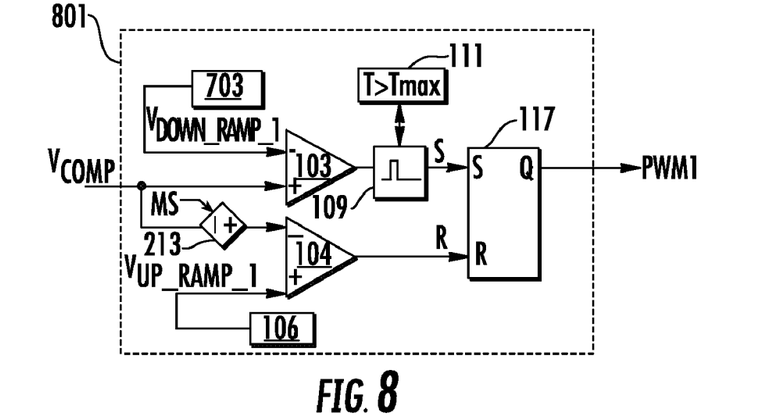
FIG. 8 is a schematic and block diagram of a modulator circuit according to another alternative embodiment which may also be used instead of the modulator circuit of FIG. 1.

FIG. 8 is a schematic and block diagram of a modulator circuit 801 according to another alternative embodiment which may also be used instead of the modulator circuit M1. The modulator circuit 801 is substantially similar to the modulator circuit 701 except that the voltage offset generator 213 is moved to between the $V_{COMP}$ signal and the inverting input of the comparator 104. The voltage offset generator 213 is configured in a similar manner and is controlled by the MS signal as previously described. Operation of the modulator circuit 801 is substantially similar to operation of the modulator circuit M1 except that the voltage offset modifies the $V_{COMP}$ signal relative to the up ramp voltages rather than the down ramp voltages.

Figure 9:
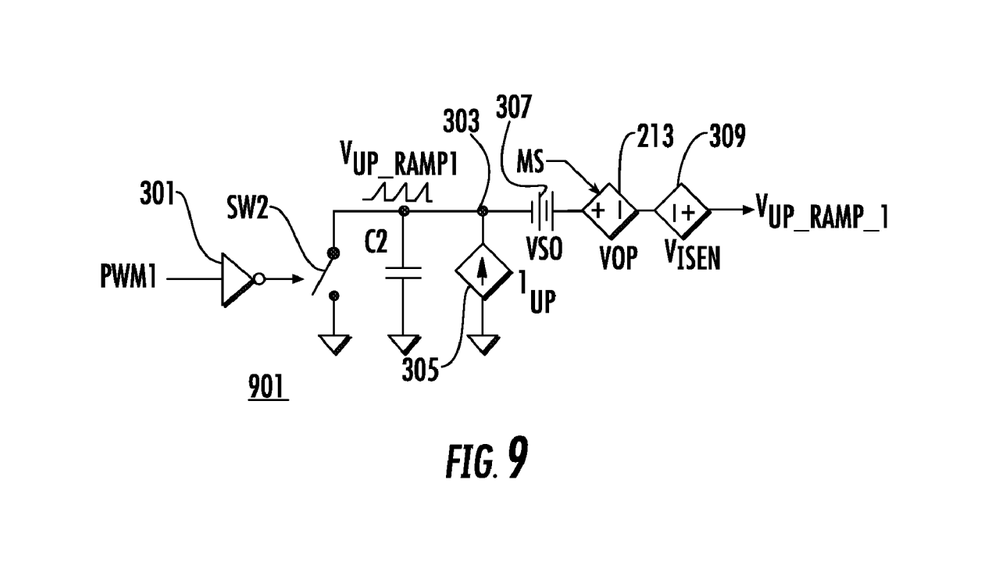
FIG. 9 is a schematic and block diagram of an up ramp generator which may be used instead of the up ramp generator of FIG. 1.

FIG. 9 is a schematic and block diagram of an up ramp generator 901 which may be used instead of the up ramp generator 106. The up ramp generator 901 is substantially identical to the up ramp generator 106 except that the voltage offset generator 213 is inserted in the path between the $V_{UP\_RAMP1}$ and $V_{UP\_RAMP\_1}$ signals. The voltage offset generator 213 is configured in a similar manner and is controlled by the MS signal as previously described. In one embodiment, the up ramp generator 901 is used in the modulator circuit M1 using the down ramp generator 703. Operation of the modulator circuit M1 with the up ramp generator 901 and the down ramp generator 703 is substantially similar except that the voltage offset modifies the up ramps signals rather than the down ramp voltages.

Figure 10:
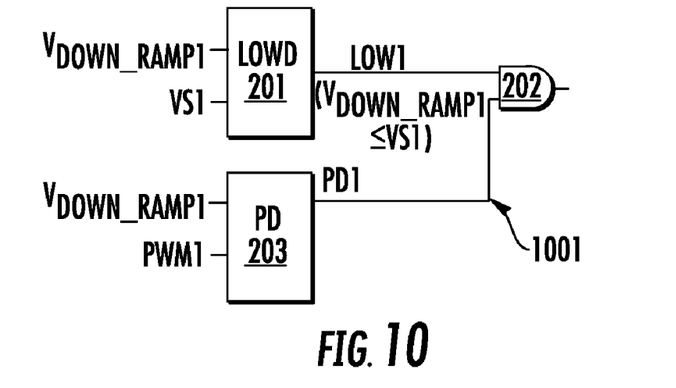
FIG. 10 is a block and schematic diagram of a reset circuit implemented according to alternative embodiment of the reset circuit of FIG. 2.

FIG. 10 is a block and schematic diagram of a reset circuit 1001 implemented according to alternative embodiment of the reset circuit 208. The reset circuit 1001 is substantially similar to the reset circuit 208 except that the inverter 205 and OR gate 205 are eliminated so that the PD1 signal is fed directly to an input of the AND gate 202 rather than the REL1 signal. In this case, the dependency on the MS signal is removed so that the $V_{DOWN\_RAMP1}$ signal may be clamped low regardless of the state of the MS signal or even if the MS signal is not used. It is appreciated that if the $V_{COMP}$ signal is sufficiently low that a lower power consumption state may exist regardless of the MS signal.

It is appreciated that multiple voltage offset generators may be employed in multiple places in the modulator circuit. For example, separate offset voltage generators may be used to adjust any one or more of the $V_{COMP}$, up ramp and down ramp voltages. It is further noted that the voltage offset generator 213 may be eliminated and not used at all. The offset voltage may facilitate a smoother transition between the PFM and PWM modes of operation. In some alternative embodiments, the difference between VS0, which is the base voltage level for the up ramp voltages, and VS1, which is the base voltage level for the down ramp voltages, may be increased to a sufficient level so that an offset voltage is avoided. Furthermore, although the offset voltage is shown as the same offset voltage added to each phase, the offset voltage may be adjusted separately on a phase by phase basis. In one embodiment, for example, the offset voltage is based on the current IL through the output inductor of the particular phase during the power reduced mode or PFM. In a specific embodiment, the offset voltage is added when MS is 1 when the inductor current goes to zero and is removed when the inductor current is above zero.

A modulator circuit for a switching regulator according to one embodiment includes first and second ramp generators, a comparator circuit and a reset circuit. The switching regulator provides a compensation voltage indicative of output voltage error. The first ramp generator generates a leading-edge ramp voltage which ramps from a first voltage to a second voltage. The second ramp generator generates a trailing-edge ramp voltage which ramps from a third voltage. The comparator circuit asserts a pulse modulation signal and causes the second ramp generator to initiate ramping of the trailing-edge ramp voltage when the leading-edge ramp voltage ramps to the compensation voltage. The comparator circuit further negates the pulse modulation signal and resets the trailing-edge ramp voltage when the trailing-edge ramp voltage ramps to the compensation voltage. The reset circuit prevents the leading-edge ramp voltage from resetting back to the first voltage if the leading-edge ramp voltage has not reached the compensation voltage while ramping. The reset circuit further clamps the leading-edge ramp voltage at the second voltage until the pulse modulation signal is asserted again.

The reset circuit may include a ramp detect circuit, a pulse detect circuit and a logic circuit. The ramp detect circuit asserts a first logic signal when the leading-edge ramp voltage is at the second voltage. The pulse detect circuit negates a second logic signal when the leading-edge ramp voltage is reset to the first voltage. The pulse detect circuit further asserts the second logic signal when the pulse modulation signal is next asserted after the leading-edge ramp voltage is reset back to the first voltage. The logic circuit asserts a reset signal to cause the first ramp generator to reset the leading-edge ramp voltage to the first voltage when the first and second logic signals are both asserted. In this manner, the leading-edge ramp voltage is not reset back to the first voltage until the pulse modulation signal is asserted, and otherwise clamps the leading-edge ramp voltage to the second voltage.

A mode select signal may be provided and asserted during a light load condition. In this case, the pulse detect circuit asserts the second logic signal when the mode select signal is not asserted, so that the leading-edge ramp voltage is always reset back to the first voltage whenever the mode select signal is not asserted. If the mode select signal is asserted, the leading-edge ramp voltage is reset based on the pulse modulation signal.

The modulator circuit may include an offset voltage generator which adds an offset voltage to at least one of the compensation voltage, the leading-edge ramp voltage and the trailing-edge ramp voltage. In one embodiment, the offset voltage generator adjusts the offset voltage based on at least one of input voltage, load current and switching frequency, or any combination thereof.

In one embodiment, the offset voltage generator is coupled to the first ramp generator to add an offset voltage to the leading-edge ramp voltage when the mode select signal is asserted. In this case, the leading-edge ramp voltage ramps from the first voltage plus the offset voltage to the second voltage plus the offset voltage. In another embodiment, the offset voltage generator is coupled to the second ramp generator to add an offset voltage to the trailing-edge ramp voltage when the mode select signal is asserted.

In yet another embodiment, the offset voltage is added to the compensation voltage which is compared to either one of the leading- or trailing-edge voltages. In either case, the offset voltage generator adds an offset voltage to the adjusted compensation voltage when the mode select signal is asserted. In one embodiment, the comparator circuit includes a comparator having a first input receiving the leading-edge ramp voltage, a second input, and an output providing a set signal used to assert the pulse modulation signal. In this case, the offset voltage generator has an input for receiving the compensation voltage and an output providing an adjusted compensation voltage to the second input of the comparator for comparison with the leading-edge ramp voltage. In another embodiment, the comparator circuit includes a comparator having a first input receiving the trailing-edge ramp voltage, a second input, and an output providing a reset signal used to negate the pulse modulation signal. In this case, the offset voltage generator has an input for receiving the compensation voltage and an output providing an adjusted compensation voltage to the second input of the comparator for comparison with the trailing-edge ramp voltage.

A multiple phase switching regulator according to one embodiment includes an output node developing an output voltage, and error circuit which compares the output voltage with a reference voltage and which provides a compensation voltage indicative thereof, and multiple phase circuits. Each phase circuit includes an output inductor having a first end coupled to the output node, a switch circuit having an input receiving a pulse modulation signal and an output coupled to a second end of the output inductor, and a modulation circuit. The modulation circuit includes first and second ramp generators, a comparator circuit and a reset circuit in a similar manner described above.

The multiple phase switching regulator includes multiple first ramp circuits, each generating a corresponding leading-edge ramp voltage. In one embodiment, each first ramp generator includes an enable input receiving an enable signal in which each first ramp generator suspends ramping and maintains voltage of a corresponding leading-edge ramp voltage when the enable signal is negated. In this case, the switching regulator includes a leading-edge ramp enable circuit which negates the enable signal to suspend each leading-edge ramp voltage of each phase circuit while any one leading-edge ramp voltage is clamped at the first voltage.

In another embodiment, each modulator of each phase circuit includes an offset voltage generator which generates an offset voltage added to any combination of the compensation voltage, the leading-edge ramp voltage and the trailing-edge ramp voltage when a mode select signal is asserted. The mode select signal is asserted during a low power or low load condition as previously described. The offset voltage may be adjusted based on at least one of input voltage, load current and switching frequency. In one embodiment, each offset voltage generator adds an offset voltage to a corresponding leading-edge ramp voltage when the mode select signal is asserted. In another embodiment, each the offset voltage generator adds the offset voltage to the compensation signal relative to either one of a corresponding leading-edge ramp voltage or a corresponding trailing-edge ramp voltage.

A method of controlling operational mode of a switching regulator which provides a compensation voltage indicative of error of an output voltage according to one embodiment includes generating a leading-edge ramp voltage which ramps from a first voltage to a second voltage and generating a trailing edge ramp voltage which ramps from a third voltage. The method further includes initiating a pulse on a pulse modulation signal and initiating ramping of the trailing-edge ramp voltage when the leading-edge ramp voltage reaches the compensation voltage, terminating the pulse on the pulse modulation signal when the trailing-edge ramp voltage reaches the compensation voltage, resetting the leading-edge ramp voltage to the first voltage after it ramps to the second voltage if the pulse is initiated on the pulse modulation signal while the leading-edge ramp voltage is ramping, and clamping the leading-edge ramp voltage to the second voltage until a pulse is initiated on the pulse modulation signal.

In a multiphase switching regulator configuration with multiple phases, the method may include generating multiple leading-edge ramp voltages including a corresponding leading-edge ramp voltage for each phase, and suspending each leading-edge ramp voltage whenever any one leading-edge ramp voltages is clamped.

The method may include receiving a mode select signal, resetting the leading-edge ramp voltage to the first voltage after it ramps to the second voltage whenever the mode select signal is negated, and clamping the leading-edge ramp voltage to the second voltage only if the mode select signal is asserted.

The method may include receiving a mode select signal and adding an offset voltage to at least one of the compensation voltage, the leading-edge ramp voltage and the trailing-edge ramp voltage when the mode select signal is asserted. The method may include adjusting the offset voltage based on any combination of input voltage, load current and switching frequency.

Although the present invention has been described in considerable detail with reference to certain preferred versions thereof, other versions and variations are possible and contemplated. Those skilled in the art should appreciate that they can readily use the disclosed conception and specific embodiments as a basis for designing or modifying other structures for providing out the same purposes of the present invention without departing from the spirit and scope of the invention as defined by the following claims.

The invention claimed is:

1. A modulator circuit for a switching regulator, wherein the switching regulator provides a compensation voltage indicative of output voltage error, wherein said modulator circuit comprises:
  a first ramp generator which generates a leading-edge ramp voltage which ramps from a first voltage to a second voltage;
  a second ramp generator which generates a trailing-edge ramp voltage which ramps from a third voltage;
  a comparator circuit, coupled to said first and second ramp generators, which asserts a pulse modulation signal and causes said second ramp generator to initiate ramping of said trailing-edge ramp voltage when said leading-edge ramp voltage ramps to the compensation voltage, and which negates said pulse modulation signal and resets said trailing-edge ramp voltage when said trailing-edge ramp voltage ramps to the compensation voltage; and
  a reset circuit, coupled to said first ramp generator, which prevents said leading-edge ramp voltage from resetting back to said first voltage if said leading-edge ramp voltage has not reached the compensation voltage while ramping and clamps said leading-edge ramp voltage at said second voltage until said pulse modulation signal is asserted again.

2. The modulator circuit of claim 1, wherein said reset circuit comprises:
  a ramp detect circuit which asserts a first logic signal when said leading-edge ramp voltage is at said second voltage;
  a pulse detect circuit which negates a second logic signal when said leading-edge ramp voltage is reset to said first voltage and which asserts said second logic signal when said pulse modulation signal is next asserted after said leading-edge ramp voltage is reset back to said first voltage; and
  a logic circuit which asserts a reset signal to cause said first ramp generator to reset said leading-edge ramp voltage to said first voltage when said first and second logic signals are both asserted.

3. The modulator circuit of claim 2, wherein a mode select signal is asserted during a light load condition, and wherein said pulse detect circuit asserts said second logic signal whenever the mode select signal is not asserted.

4. The modulator circuit of claim 1, wherein a mode select signal is asserted during a light load condition, further comprising an offset voltage generator which adds an offset voltage to at least one of the compensation voltage, said leading-edge ramp voltage and said trailing-edge ramp voltage.

5. The modulator circuit of claim 4, wherein said offset voltage generator adjusts said offset voltage based on at least one of input voltage, load current and switching frequency.

6. The modulator circuit of claim 4, wherein said offset voltage generator is coupled to said first ramp generator to add an offset voltage to said leading-edge ramp voltage when the mode select signal is asserted, wherein said leading-edge ramp voltage ramps from said first voltage plus said offset voltage to said second voltage plus said offset voltage.

7. The modulator circuit of claim 4, wherein said offset voltage generator is coupled to said second ramp generator to add an offset voltage to said trailing-edge ramp voltage when the mode select signal is asserted.

8. The modulator circuit of claim 4, wherein:
  said comparator circuit comprises a comparator having a first input receiving said leading-edge ramp voltage, a second input, and an output providing a set signal used to assert said pulse modulation signal; and
  wherein said offset voltage generator has an input for receiving the compensation voltage and an output providing an adjusted compensation voltage to said second input of said comparator, wherein said offset voltage generator adds an offset voltage to said adjusted compensation voltage when the mode select signal is asserted.

9. The modulator circuit of claim 4, wherein:
  said comparator circuit comprises a comparator having a first input receiving said trailing-edge ramp voltage, a second input, and an output providing a reset signal used to negate said pulse modulation signal; and
  wherein said offset voltage generator has an input for receiving the compensation voltage and an output providing an adjusted compensation voltage to said second input of said comparator, wherein said offset voltage generator adds an offset voltage to said adjusted compensation voltage when the mode select signal is asserted.

10. A multiple phase switching regulator, comprising:
  an output node developing an output voltage;
  an error circuit which compares said output voltage with a reference voltage and which provides a compensation voltage indicative thereof; and
  a plurality of phase circuits, each phase circuit comprising:
    an output inductor having a first end coupled to said output node and having a second end;
    a switch circuit having an input receiving a pulse modulation signal and an output coupled to said second end of said output inductor; and
    a modulation circuit, comprising:
      a first ramp generator which generates a leading-edge ramp voltage which ramps from a first voltage to a second voltage;
      a second ramp generator which generates a trailing-edge ramp voltage which ramps from a third voltage;
      a comparator circuit, coupled to said first and second ramp generators, which asserts said pulse modulation signal and causes said second ramp generator to initiate ramping of said trailing-edge ramp voltage when said leading-edge ramp voltage reaches said compensation voltage, and which negates said pulse modulation signal when said trailing-edge ramp voltage reaches said compensation voltage; and
      a reset circuit, coupled to said first ramp generator, which prevents said leading-edge ramp voltage from resetting back to said first voltage if said leading-edge ramp voltage has not reached said compensation voltage while ramping and which clamps said leading-edge ramp voltage at said second voltage until said pulse modulation signal is asserted again.

11. The multiple phase switching regulator of claim 10, further comprising:
said plurality of phase circuits comprising a plurality of first ramp circuits generating a corresponding plurality of leading-edge ramp voltages;
each of said plurality of first ramp generators comprising an enable input receiving an enable signal in which said each of said plurality of first ramp generators suspends ramping and maintains voltage of a corresponding one of said plurality of leading-edge ramp voltages when said enable signal is negated; and
a leading-edge ramp enable circuit which negates said enable signal to suspend all of said plurality of leading-edge ramp voltages while any one of said plurality of leading-edge ramp voltages is clamped at said first voltage.

12. The multiple phase switching regulator of claim 10, wherein a mode select signal is asserted during a light load condition, wherein each said modulator of each of said plurality of phase circuits further comprises an offset voltage generator which generates an offset voltage added any combination of said compensation voltage, said leading-edge ramp voltage and said trailing-edge ramp voltage when the mode select signal is asserted.

13. The multiple phase switching regulator of claim 12, wherein each said offset voltage generator adjusts said offset voltage based on at least one of input voltage, load current and switching frequency.

14. The multiple phase switching regulator of claim 12, wherein each said offset voltage generator adds said offset voltage to a corresponding leading-edge ramp voltage when the mode select signal is asserted.

15. The multiple phase switching regulator of claim 12, wherein each said offset voltage generator adds said offset voltage to said compensation signal relative to a selected one of a corresponding leading-edge ramp voltage and a corresponding trailing-edge ramp voltage.

16. A method of controlling operational mode of a switching regulator which provides a compensation voltage indicative of error of an output voltage, said method comprising:
generating a leading-edge ramp voltage which ramps from a first voltage to a second voltage;
generating a trailing edge ramp voltage which ramps from a third voltage;
initiating a pulse on a pulse modulation signal and initiating ramping of the trailing-edge ramp voltage when the leading-edge ramp voltage reaches the compensation voltage;
terminating the pulse on the pulse modulation signal when the trailing-edge ramp voltage reaches the compensation voltage;
resetting the leading-edge ramp voltage to the first voltage after it ramps to the second voltage if the pulse is initiated on the pulse modulation signal while the leading-edge ramp voltage is ramping; and
clamping the leading-edge ramp voltage to the second voltage until a pulse is initiated on the pulse modulation signal.

17. The method of claim 16, wherein the switching regulator comprises a multiphase switching regulator with a plurality of phases, further comprising:
said generating a leading-edge ramp voltage comprising generating a plurality of leading-edge ramp voltages including a corresponding leading-edge ramp voltage for each of the plurality of phases; and
suspending each of the plurality of leading-edge ramp voltages whenever any one of the plurality of leading-edge ramp voltages is clamped.

18. The method of claim 16, further comprising:
receiving a mode select signal;
wherein said resetting comprises resetting the leading-edge ramp voltage to the first voltage after it ramps to the second voltage whenever the mode select signal is negated; and
wherein said clamping the leading-edge ramp voltage comprises clamping the leading-edge ramp voltage to the second voltage only if the mode select signal is asserted.

19. The method of claim 16, further comprising:
receiving a mode select signal; and
adding an offset voltage to at least one of the compensation voltage, the leading-edge ramp voltage and the trailing-edge ramp voltage when the mode select signal is asserted.

20. The method of claim 19, further comprising adjusting the offset voltage based on any combination of input voltage, load current and switching frequency.

* * * * *